United States Patent [19]
Amoser

[11] 3,798,064
[45] Mar. 19, 1974

[54] CONGEALING AND CLEANING MIXTURE

[75] Inventor: Hans Amoser, Rheingaublic, Germany

[73] Assignee: Braas & Co. GmbH, Frankfurt am Main, Germany

[22] Filed: Dec. 10, 1971

[21] Appl. No.: 206,873

[30] Foreign Application Priority Data
Dec. 16, 1970 Germany............................ 2061827

[52] U.S. Cl.................. 134/7, 134/22 R, 252/140, 252/145, 252/160, 252/163, 252/164, 252/165, 264/39
[51] Int. Cl............................ B08b 7/00, B08b 9/08
[58] Field of Search................. 134/7, 22 R; 264/39; 252/140, 145, 160, 163, 164, 165

[56] References Cited
UNITED STATES PATENTS

| 2,090,708 | 8/1937 | Stahl | 252/164 X |
| 2,346,228 | 4/1944 | Merrill et al. | 134/7 X |
| 2,779,696 | 1/1957 | Rutherford | 134/7 |
| 3,071,498 | 1/1963 | Kaskel | 134/7 |
| 3,084,075 | 4/1963 | Doan et al. | 264/39 X |

Primary Examiner—Barry S. Richman
Attorney, Agent, or Firm—Browne, Beveridge, DeGrandi & Kline

[57] ABSTRACT

A granular, fluid mixture comprising polyvinyl chloride, a lubricant, sodium tripolyphosphate, and optionally a basic heavy metal compound, and a method of employing the mixture in cleaning the hot metal pots of appliances used in processing plastics are disclosed. This composition and process eliminate the necessity of cooling, shutting down, and dismantling plastic processing appliances before cleaning them free of plastic residues.

10 Claims, No Drawings

CONGEALING AND CLEANING MIXTURE

The invention relates to a granular, fluid mixture for removing or expelling substances employed in appliances for processing plastic, and for cleaning the hot metal parts which have come into contact with the plastic during production.

Such mixtures are subject to a great deal of interest as the removal of the substances contained in plastic processing machines, in particular during cleaning operations, is always very time-consuming and consequently disruptive to production and expensive. They can even lead to faulty production on starting-up again, in particular if after the cleaning it is necessary to assemble complicated and expensive dismantled tools having extremely accurate fitting surfaces.

It is known that during the processing of plastics, e.g. in extrusion presses and automatic injection moulding machines, particularly good results are obtained if it is possible to work for a long time under the same conditions. However, during the manufacturing cycle variations usually occur, for example due to fluctuations or deficiencies in the power feed, servo-mechanisms, compressed air or cooling media, which lead to stoppages and frequently to the complete failure of production machines.

Emulsions are known which are used for cleaning extruder screws in the processing of thermoplastics and thermosetting plastics. These emulsions have to be mixed with the production mixture, which is present in powder, agglomerate or granular form, to form a crumbly moist composition. In order to prevent plasticisation these compositions are used at about 50 percent of the normal operating temperature, for example at 90°C instead of 180°C. The machines must therefore be cooled before the feed of the cleaning material.

In processing thermoplastics, in particular in the extrusion and injection-moulding of hard and soft PVC, the load duration of the material and giving off of HCl, commencing therewith, is dependent on the time and temperature load of the material to be extruded, on the temperature of the material during operation and on the surface condition of screws and the surface condition of screws and tools. During production, both in the extrusion and injection moulding processes, slight decomposition phenomena, which are always present to a greater or lesser extent and lead to the formation of ferric chloride become apparent and are noticeable on all the metal parts which come into contact with the hot material.

A further disadvantage lies in the fact that in practice it is impossible during the shut-down of production machines and the interchange of tools, to leave full the individual extrusion and injection moulding tools, cylinders and screws. It is therefore necessary to dismantle and clean the tools while still in the hot state, after emptying the screw.

Nozzles, mandrels and other tool components are especially susceptible during assembly and disassembly.

Generally, after a specific number of tool interchanges the tools are usually no longer true to size or leakproof. Frequently in order to avoid material residues it is necessary to resort to using abrasive paper, or sometimes even grinding members or grinding wheels. In such cases the free passages of the tools, e.g. the "nozzle orifice," may be altered and the surface finish of the parts which come into contact with the material is often roughened and is no longer suitable for satisfactory processing.

Another defect lies in the fact that with each tool assembly a source of error may arise so that after starting the machines another tool interchange must be effected. Frequently on account of faulty installation of the tools, for example due to the adoption of too large or too small fitting tolerances, there occurs unsatisfactory dimensional stability of the extruder heads, i.e., the tools have to be dismounted again and cleaned. Consequently a particularly high loss of material and production time results, since during undesired machine stoppage periods, made necessary by repairs to individual units in the extrusion line, loss of power, compressed air, or cooling water, the extrusion dies must be dismounted and the screws and cylinders emptied, cleaned and reassembled.

When it is possible to install an extrusion die accurately in the cold state after a stoppage, it is still necessary to centre the detachable nozzle in order to obtain a uniform wall thickness of the tubing or section element.

We have now found a congealing or freezing and cleaning mixture which makes it possible to remove a production mixture from plastics processing machines at a normal operating temperature, which is usually between 170°C and 210°C, and subsequently to work further with another production mixture at constant temperature, after the cleaning mixture itself has been removed. In this way production time lost is substantially reduced, tool resetting eliminated and tool hold simplified. Furthermore the plastics processing machines, e.g., extrusion presses or injection moulding machines in the fully filled state, i.e., with full screws, cylinders and extrusion dies, may be shutdown when hot and after a storage time of any length, e.g., after stoppage days, holidays etc., may be heated up again without being cleaned and put into production at once in the centred condition.

Accordingly the present invention provides a granular, fluid mixture for removing or expelling the substances employed in appliances for processing plastic and for cleaning hot metal parts which during production have come into contact with plastic, which comprises polyvinyl chloride, a lubricant, a basic heavy metal compound and sodium tripolyphosphate.

An essential advantage in accordance with the invention lies in that the mixture may generally be employed at the normal working temperature between 170°–210°C. When changing from production mixtures to the mixture according to the invention and vice versa, the apparatus neither needs to be heated nor cooled.

It has further proved particularly advantageous to use in accordance with the invention a mixture containing 100 parts by weight of polyvinyl chloride,
5 to 10 parts by weight of co-ated chalk,
1 to 6 parts by weight of oxide wax,
0 to 6 parts by weight of 3-basic lead oxide,
1 to 4 parts by weight of sodium tripolyphosphate.

By the term "co-ated chalk" as used herein is meant calcium carbonate containing stearic acid.

The content of 3-basic lead oxide in the mixture enables the mixture to be mixed with all compositions stabilized with lead, barium or cadmium, so that they may be expelled. The content of sodium tripolyphosphate in the mixture converts chlorine compounds which may arise during the processing to sodium chloride.

Moreover it is particularly advantageous in accordance with the invention to use a mixture which contains 5 to 10 parts by weight of co-ated chalk, 1 to 6 parts by weight of oxide wax, 1 to 4 parts by weight of sodium tripolyphosphate, 1 to 5 parts by weight of a sulphur-free organo-tin stabiliser and 1 to 5 parts by weight of calcium stearate per 100 parts by weight of polyvinyl chloride. In this case any decomposition products which may be formed from the PVC are preferably neutralised.

The content of sulphur-free organo-tin stabiliser enables the removal of all compositions stabilised with organo-tin.

The mixtures in accordance with the invention may advantageously be produced if the individual constituents of the mixture are mixed homogeneously at a temperature of from 120° to 150°C, whereby the lubricant present is completely melted down and thereafter cooling the mixture to room temperature, the mixture remaining fluid. This ensures in particular a very uniform distribution of the individual constituents of the fluid mixture so that it can be processed very easily and can no longer be mechanically separated out. The invention is further illustrated by the following Examples in which all parts are parts by weight unless otherwise stated.

Example 1

| | |
|---|---|
| PVC K-70 | 100 parts |
| co-ated chalk | 6 parts |
| oxide wax | 2 parts |
| 3-basic lead oxide | 4 parts |
| sodium tripolyphosphate | 2 parts |

The mixture which is able to withstand high temperatures serves as a cleaning and freezing mixture, it removes production mixtures from extruders and injection moulding machines and can remain in the machines until cooling down takes place. These machines can be started up after any period of time without needing to be cleaned.

Example 2

| | |
|---|---|
| PVC K-70 | 100 parts |
| co-ated chalk | 8 parts |
| oxide wax | 5 parts |
| organo-tin stabiliser | 3 parts |
| calcium stearate | 2.5 parts |
| sodium tripolyphosphate | 3 parts |

This mixture includes only constituents which are in accordance with foodstuffs regulations, so that it can be used for the removal of compositions which are intended as foodstuffs.

The mixture accurately obtained in accordance with the invention substantially reduces the shutdown times of machines and contributes considerably to lowering production costs. With precise observation of the normal production cycle it is also possible for example to use the mixture, which can be mixed with production material in various proportions, in order to reliably expel large quantities of decomposed material residue from screws, cylinders or extrusion dies formed during production. Subsequently pure cleaning and freezing mixture can be added and the machine shutdown in the hot-running condition. The material surfaces which come into contact with the production material are de-acidified. Only residues of common salt, if anything, remain on the metal surfaces, i.e., it is no longer necessary to protect the material surfaces with chromium plating. The production of the tools becomes much cheaper. Greasing or oiling of the dismantled extruder heads, moulds, screws, cylinders, etc. for protection against rust formation due to acidification of the material surface is likewise no longer necessary, especially as these preservatives do not prevent sub-surface corrosion of the tools, they protect the steel parts only against the influence of extruder humidity. Grease and oil prove to be very disadvantageous to these parts in the case of the novel application, since the removal of the grease and oil residue is extremely difficult. Frequently breakdowns occur due solely to these residues, the mixture according to assistance here. The extruders' heads are filled with the novel cleaning and freezing material before the machines are stopped. After disassembly and during storage no cleaning and greasing are necessary.

I claim:

1. A granular, fluid mixture for removing or expelling the substances employed in appliances for processing plastic and for cleaning hot metal parts which during production have come into contact with plastic, which mixture consists essentially of polyvinyl chloride, a lubricant, and sodium tripolyphosphate.

2. A granular fluid mixture as claimed in claim 1 which may be employed at normal operating temperatures between 170° and 210°C.

3. A mixture as claimed in claim 1 which consists essentially of the following ingredients:
   5 to 10 parts by weight of co-ated chalk;
   1 to 6 parts by weight of oxide wax;
   0 to 6 parts by weight of 3-basic lead oxide;
   1 to 4 parts by weight of sodium tripolyphosphate; and
   100 parts by weight of polyvinyl chloride.

4. A mixture as claimed in claim 1 which consists essentially of the following ingredients:
   5 to 10 parts by weight of co-ated chalk;
   1 to 6 parts by weight of oxide wax;
   1 to 4 parts by weight of sodium tripolyphosphate;
   1 to 5 parts by weight of a sulphur-free organo-tin stabiliser;
   1 to 5 parts by weight of calcium stearate; and
   100 parts by weight of polyvinyl chloride.

5. A process for the production of a mixture as claimed in claim 1 which process consists essentially of mixing together the individual constituents homogeneously at a temperature of from 120° to 150°C and thereafter cooling the mixture to room temperature.

6. A granular fluid mixture for removing or expelling the substances employed in appliances for processing plastic and for cleaning hot metal parts which during production have come into contact with plastic, which mixture consists essentially of polyvinyl chloride, a lubricant, sodium tripolyphosphate and a basic heavy metal compound.

7. A process for cleaning apparatus employed in the processing of thermoplastics materials which process consists essentially of the following steps:
   a. introducing into said apparatus at a temperature of from 170° to 210°C a fluid mixture consisting essentially of polyvinyl chloride, a lubricant, and sodium tripolyphosphate;

b. passing said mixture through said apparatus and
c. removing said mixture from said apparatus.

8. A process as claimed in claim 7 wherein said mixture consists essentially of the following ingredients:
5 to 10 parts by weight of co-ated chalk;
1 to 6 parts by weight of oxide wax;
0 to 6 parts by weight of 3-basic lead oxide;
1 to 4 parts by weight of sodium tripolyphosphate; and
100 parts by weight of polyvinyl chloride.

9. A process as claimed in claim 7 wherein said mixture consists essentially of the following ingredients:
5 to 10 parts by weight of co-ated chalk;
1 to 6 parts by weight of oxide wax;
1 to 4 parts by weight of sodium tripolyphosphate;
1 to 5 parts by weight of a sulphur-free organo-tin stabiliser;
1 to 5 parts by weight of calcium stearate; and
100 parts by weight of polyvinyl chloride.

10. A process for cleaning apparatus employed in the processing of thermoplastic materials which process consists essentially of the following steps:
a. introducing into said apparatus at a temperature of from 170° to 210° C. a fluid mixture consisting essentially of polyvinyl chloride, a lubricant, sodium tripolyphosphate and a basic heavy metal compound;
b. passing said mixture through said apparatus; and
c. removing said mixture from said apparatus.

* * * * *